United States Patent [19]
Johnson

[11] Patent Number: 5,285,612
[45] Date of Patent: Feb. 15, 1994

[54] INTERLOCKING JOINT WITH NOTCH REINFORCEMENT

[76] Inventor: David W. Johnson, 1884 Sunset Blvd., San Diego, Calif. 92103

[21] Appl. No.: 696,922

[22] Filed: May 8, 1991

Related U.S. Application Data

[63] Continuation-in-part of Ser. No. 541,547, Jun. 21, 1991, Pat. No. 5,024,036.

[51] Int. Cl.$^5$ ............................................. E04H 12/18
[52] U.S. Cl. ................................. 52/655.1; 403/346; 403/382; 52/720
[58] Field of Search ............ 446/106; 273/153 R, 273/160; 403/346, 347, 382, 292–300; 29/469.5, 525; 156/293, 294; 52/666–668, 646, 648, 645

[56] References Cited

U.S. PATENT DOCUMENTS

| | | | |
|---|---|---|---|
| 470,514 | 3/1892 | Simpson | 403/300 |
| 1,493,811 | 5/1924 | Frewen | 52/503 |
| 1,564,568 | 12/1965 | Hayden | 52/284 |
| 2,031,324 | 2/1936 | Lewellen | 52/667 |
| 2,868,602 | 1/1959 | Drezner | 403/298 |
| 3,100,555 | 8/1963 | Ashton | 52/309.1 |
| 3,228,155 | 1/1966 | Biesanz | 52/309.3 |
| 3,282,006 | 11/1966 | Halsey et al. | 52/301 |
| 3,927,950 | 12/1975 | Herrmann et al. | 52/668 |
| 4,060,950 | 12/1977 | Rackard et al. | 52/668 |
| 4,068,346 | 1/1978 | Binder | 403/292 |
| 4,619,089 | 10/1986 | Stein et al. | 403/382 |
| 4,680,224 | 7/1987 | O'Connor | 428/294 |
| 4,715,503 | 12/1987 | Johnson | 211/74 |
| 4,828,122 | 5/1989 | Day | 248/243 |
| 5,096,645 | 3/1992 | Fink | 264/229 |

FOREIGN PATENT DOCUMENTS 427214 11/1947 Italy ........................... 52/606

Primary Examiner—James L. Ridgill, Jr.
Attorney, Agent, or Firm—Ralph S. Branscomb

[57] ABSTRACT

In an interlocking beam construction in which hollow beams are notched and interlocked to define a completely rigid joint without fasteners, reinforcement inserts are slid into the beam to the notched area. The inserts are notched to conform to the notches in the respective beams so that the interlocking function of the beams is accommodated, but the weakness that would otherwise be produced at the joint due to the notching of the otherwise hollow beams is eliminated.

29 Claims, 2 Drawing Sheets

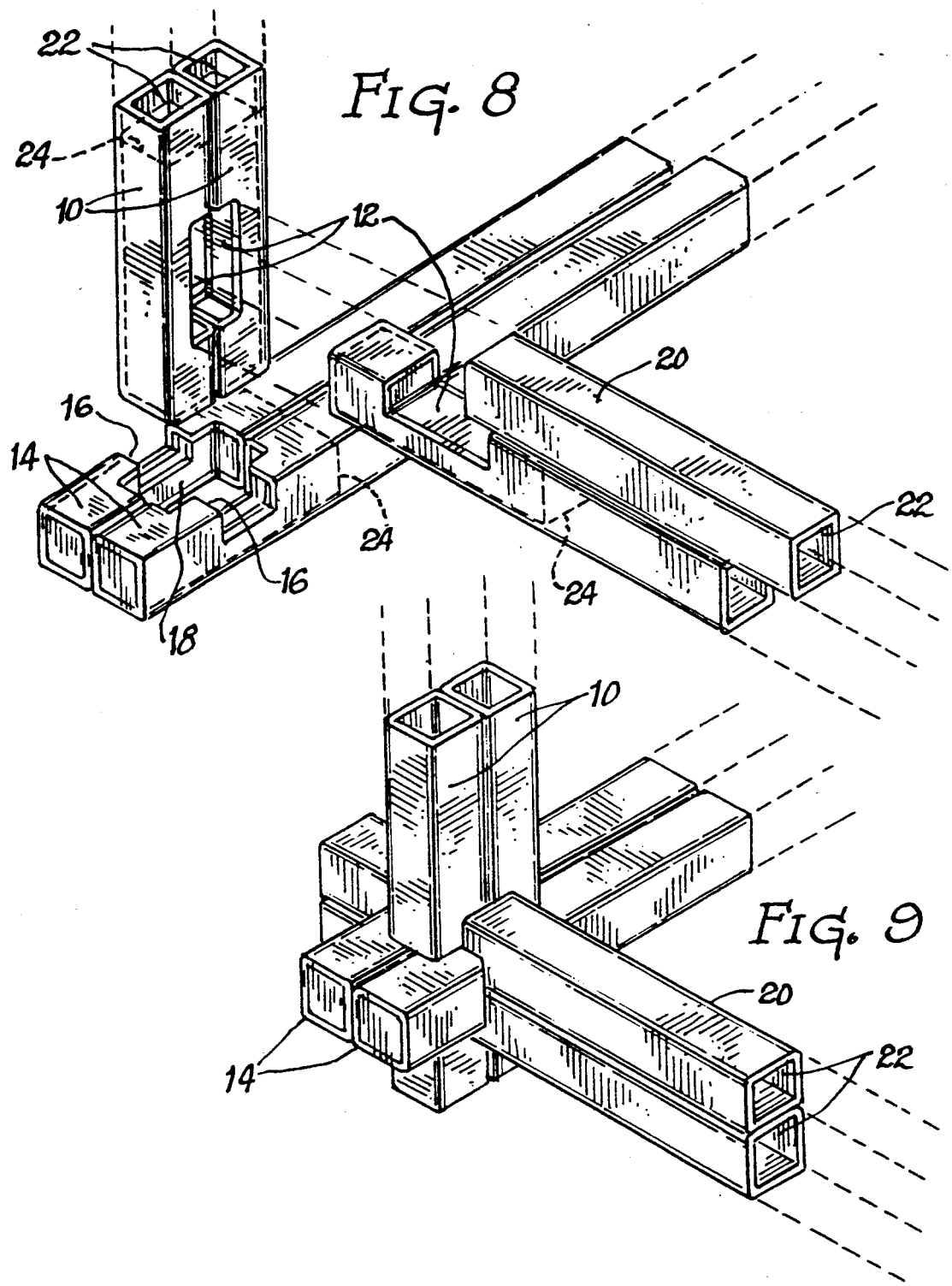

INTERLOCKING JOINT WITH NOTCH REINFORCEMENT

This application is a continuation-in-part of application Ser. No. 541,547, filed Jun. 21, 1990 now U.S. Pat. No. 5,024,036, filed Jun. 18, 1991, for INTERLOCKING SUPPORT STRUCTURES.

This invention is another step in the evolutionary development of interlocking joint construction as represented in a number of patents which are enumerated in the parent patent to this case. The interlocking joint which is at the heart of these inventions enables six elongated members arranged in three orthogonal pairs to be interlocked to define a rigid orthogonal joint due to the particular notching arrangement of the individual members, without the use of mechanical fasteners or glue.

This construction was first evidenced as the joints of a reticulated grid furniture structure disclosed in the first of the patents in this series, U.S. Pat. No. 4,715,503 issued Dec. 29, 1987. In the intervening time period, patents have issued on beams, enclosures and stands utilizing the joint, with the parent application of this case covering additional modifications and implementations of the basic joint construction.

Although in the beginning the joint was made primarily in hardwood, the inventor has now progressed to composite construction in which structural beams of fiberglass or other high-strength fibers in combination with a resin matrix such as polyester are pultruded through specially made pultrusion dyes and are then notched at strategic locations along their length so that they can interlock with one another to define rigid structures.

A pultruded beam comprised of glass fibers, or carbon, or some other kind of fiber, in a cured epoxy, polyester, or vinlyester matrix resin base have considerable strength in the longitudinal direction for tensile or compressive loads. At the joint areas however, because glass fibers are being cut to create the interlocking notches and because of lower shear strengths, internal weakness results. It is this weakness which the instant invention addresses. Although joint strengths could be alternatively improved by increasing the thickness of the beams, this adds a necessary mass and bulk to the structure between joints. For example, a good truss structure built with interlocking pultruded composite beams will have internodal spacings of approximately 20 times the cross-sectional thickness of each of the beams. A one-inch wide beam construction might have about 20 inches between joints. Because of this, the 20-inch lengths between joints are quite strong compared to the joint and adds an extra margin before failure. However, since the construction will always fail at the joints anyway, this extra margin is not useful but only adds additional weight.

This attempt to optimize strength-to-weight is addressed in the parent application, in which a beam embodiment was shown having a reduced diameter between nodes or joint areas. This would accomplish substantially the same purpose as the instant invention. However, having a beam with a substantially continuously-varying diameter impossibilitates the creation of beams by a simple pultrusion. The tapered beams would have to be machined after being pultruded. Machinery material adds costs of producing a larger-than-necessary part. It would be extremely difficult to create this configuration in a non-solid beam. Since hollow beams represent a legitimate and highly promising direction of development, this would represent a substantial disadvantage.

There is need for a means of reinforcing the beams at the notched joint area of a hollow beam, which would create strong joints that would not fail prior to the failure of straight beam lengths in stress situations, but which would permit the relatively inexpensive and simple construction of beams by the pultrusion process.

SUMMARY

The instant invention fulfills the above-stated need by providing a composite insert body which has a notch conforming substantially exactly to the notch in the respective beam in which it will be inserted. The insert is slipped into the beam and longitudinally adjusted in the beam until the beam notch and the insert notch align. The insert can be held in its final positioning by the compressive force of the hollow beam on the sides of the insert, or, as would usually be the case, it would be epoxied to the beam at that point.

The inserts could be made in a variety of different ways, including molding, in which a solid piece would be ejected from the injection mold or a solid pultrusion could be machined. However, in a very important embodiment the inserts themselves are cut from a continuous pultrusion, which may be solid, hollow, or hollow defining internal webs for high strength-to-ratio, which may be more costly in an injection mold.

BRIEF DISCUSSION OF THE DRAWINGS

FIG. 8 illustrates a typical joint with the component beams being reinforced with the inserts; and, FIG. 9 illustrates the completed, interlocked joint.

DETAILED DESCRIPTION OF PREFERRED EMBODIMENTS

Figure 1:
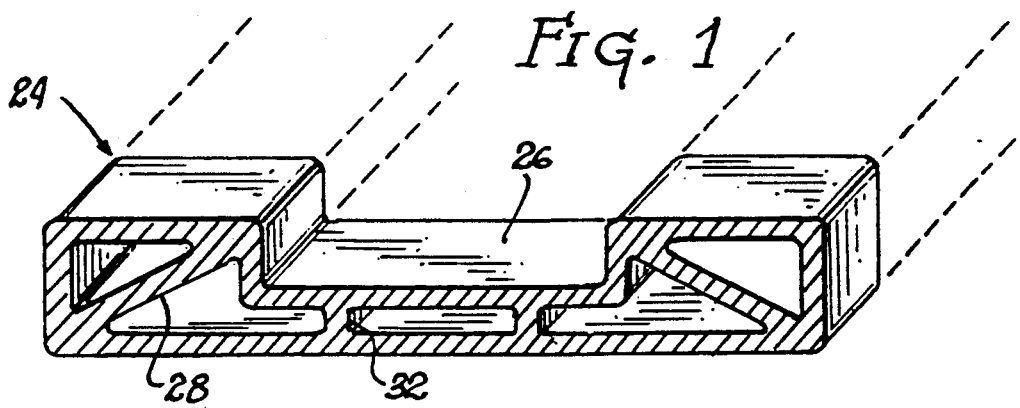
FIG. 1 is a perspective view of an insert body cut from a length of pultrusion.
Figure 2:
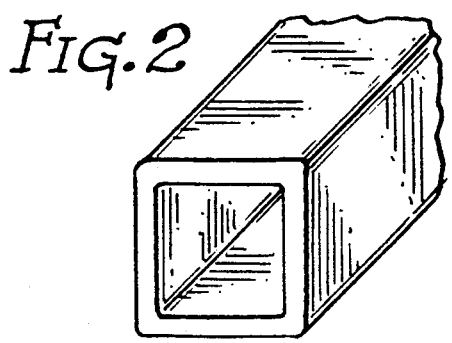
FIG. 2 is a perspective view of the end of a typical beam used in the instant construction.

An overall understanding of the interlocking beam construction is obtained from a brief review of FIGS. 8 and 9. FIG. 9 illustrates the completed joint, and FIG. 8 illustrates the six beam members, provided in pairs, that define the interlocking notches that enable the joint to interlock.

As seen in FIG. 8, each pair is orthogonal to the other two pairs. Three of the beams, as indicated at 10, define what has been called a "full notch" 12 in the prior patent. This notch is actually twice as wide and half as deep as the diameter of the beam members 10, or all of the beam members for that matter as they are all identical in cross-section except at the joint area.

In addition to the three full-notched beams 10, two of the beams 14 define the full notch 12 and another half-size notch 16 to define a compound notch 18. The sixth, last beam 20 is not notched at all. This is sometimes referred to as a "key" or "key post" as it locks the beam into a rigid configuration when it is slid into place as the last piece of the six-beam configuration.

The illustrated beams are all hollow, creating an internal void 22. The beams would ordinarily be created in an extrusion process, or even more likely by pultrusion, which is substantially identical to extrusion except that the fibers are pulled through the dye rather than being pushed through it. According to the construction that is now undergoing serious research by the inventor under contract with major utility companies, the beams are pultruded composites, with the composite fibers being glass. It should be noted that there are thousands of types of fibers of different sizes and characteristics, with two of the most popular being glass fibers and carbon or graphite fibers. The latter are expensive but are six or seven times higher in modulus of elasticity as glass fibers. However, glass fibers are relatively inexpensive and can endure tremendous tensile and compressive loads.

However, it can be appreciated by an examination of FIG. 8 that the structural integrity of the continuous fibers pultruded into beam form is undermined by having ⅓ or ⅔ of the members cut through to define the joint. Although the notches in the beams are supported to some extent by the interlocking structure of the other beams, nonetheless, the overall strength of the structure is considerably reduced.

Figure 4:
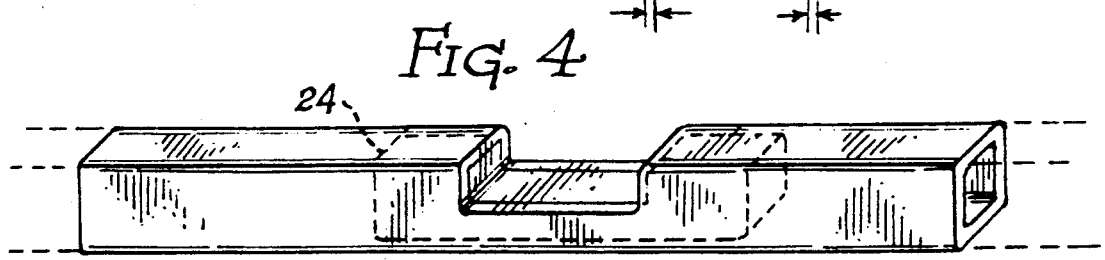
FIG. 4 is a perspective view of a beam at the notch area showing the insert in place.

To overcome this, an insert body such as that shown at 24 in FIG. 1 is used in this invention. The insert body has a transverse cross-sectional area that is substantially identical to the internal configuration of the beams, so that it can be slipped into the end of the beam. Insert body 24 has a full notch 26 defined midway into one surface. This notch is called a "nesting notch" in the claims to distinguish it from the jointing notch of the beams. The notch 26 should either align exactly with the notch 12 in the beam as shown in FIG. 4, or it could actually extend into the void a thousandth of an inch or more beyond the beam to ensure that slight misalignment of the insert body would not throw the forces at the joint back into the skin of the beam.

Figure 7:
FIG. 7 is a perspective view of a solid insert body.

The simplest way to make the insert is shown in FIG. 7, where it is solid. This kind of insert could be molded, as there are ways of injection molding composites, or it can be made in several other ways, such as machining from a solid composite pultrusion.

One of the most promising fabrication techniques, however, would be the creation of an elongated member which would extend along the lines shown in phantom in FIG. 1, with each insert being cut as a segment, each segment requesting a length equal to the inside and inseam of the hollow beam. This would permit the nesting notch 26 to be defined precisely and efficiently as the member is pultruded, and would also enable the interior to be made substantially hollow, with reinforcing webs such as webs 28 and 32 incorporated for strength. This would yield an additional strength-to-weight advantage. These webs 32 particularly adapt the insert for use as compound notched members. These members would have to be milled or otherwise cut to define the half-notch 33 if the pultrusion process were used to create the insert bodies. The webs 32 would define reinforcing walls for this notch.

Figure 3:
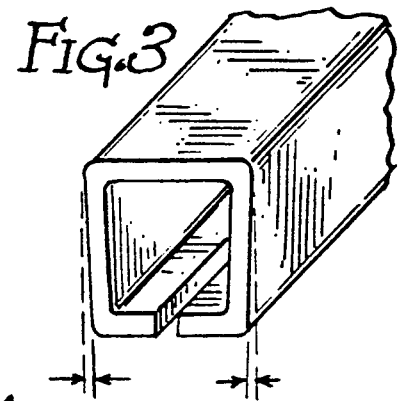
FIG. 3 illustrates the beam of FIG. 2 but with a continuous slit in one side to assist positioning the insert.
Figure 5:
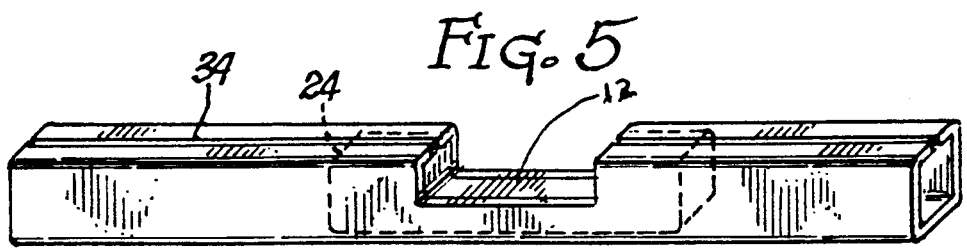
FIG. 5 is a perspective view of the slit beam of FIG. 3 showing the notch area.
Figure 6:
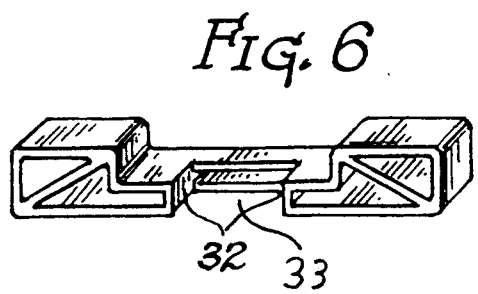
FIG. 6 is a perspective view of a modified webbed beam created by pultrusion and subsequently notched to create the compound notch used in some of the beams at the joint.

A modified form of beam adapted particularly for use with these inserts is shown in FIG. 5. In this embodiment, the beam is provided with a long slit 34 which has the express purpose of permitting the assembler to slide the insert body along the length of the beam, inside the beam, by inserting a thin tool into the slit and moving it back and forth. Of course there would be some strength lost due to the slit, which would ordinarily be laid up against another member, either identically having the slit, or being solid or hollow but not split. By slitting the beam however, the sides could be deflected inwardly slightly as shown in FIG. 3, with the body of the beam being slightly resilient so that the beam would compress around the insert bodies and hold them in place, thus allowing self-clamping to assist curing/bonding.

In any event, in all instances the insert body would be coated with epoxy prior to assembly, or otherwise have epoxy inserted at the interfaces between the insert body and the beam itself to create a permanent epoxy bond, indicated at 36 in FIG. 4, between the insert and the interior surface of the beam to both reinforce the beam and prevent migration of the insert from the notch region before the notch is incorporated into a joint. This bond can be made with a wide variety of epoxy resins depending on the qualities of strength, flexibility, corrosion resistance, weight, cost, beam size and weight, electrical conduction/dielectric, and magnetic field properties and others that are needed in a particular installation, and is under the direction of the structural site engineer. Minnesota Mining and Manufacturing thermoset resin for glass fibers works well. Epoxy might also be used at the joint area to secure the beams to one another.

The insert body would ordinarily be made of composite materials just as are the beams. This would be fiberglass with a suitable epoxy. If the pultrusion technique were used to create the insert bodies, the fibers could either be unidirectional, running longitudinally with the length of the pultrusion, or the could be intermixed with mat or weave fibers to increase the shear strength. Also, the inserts could be made of a different material from the beams themselves, such that the insert might have several times the strength of the overall beam. For example, the insert could be made of carbon fibers with some being in the mat or weave configuration, providing an insert that is five or six times higher in modulus of elasticity as the rest of the beam.

As can be seen in FIG. 8, the ideal situation for end joints is to dimension the notches in the beam identically with the notches in the insert body so that the insert body ends are substantially flush with the ends of the beams to prevent ingress of weather elements and debris into the beam and to produce a finished look. Of course the ends could be completely sealed by the application of epoxy.

The techniques disclosed herein would be particularly useful when it is necessary or highly desirable to create a very high strength-to-weight ratio epitomized, for example, in space vehicles. However, this is also a major consideration for land vehicles and aircraft. Strength-to-weight ratios would be an important consideration in many implementations of the composite beam construction, being supplanted by strength-to-cost considerations in some instances. However, inasmuch as the cost of strengthening the structure by the use of the inserts disclosed herein is minimal, it could be used in virtually all interlocking composite beam construction.

I claim:

1. A reinforcement for a hollow beam comprising an outer wall with a continuous internal structural void of substantially uniform cross section and a jointing notch defined into the side of the beam intermediate the ends of said beam for the purpose of interlocking with a crossmember, said jointing notch communicating with said void through said outer wall causing a discontinuity therein with an unsupported wall edge which defines said notch, said reinforcement comprising:
   (a) a reinforcement insert body dimensioned to slide into and substantially flushly fit within said void; and,
   (b) said insert body having a nesting notch configured to substantially align with said jointing notch such that said notches together define a composite notch with a substantially continuous contour to reinforce said beam in the region around said jointing notch.

2. Structure according to claim 1 and including an epoxy bond between said insert body and said beam.

3. Structure according to claim 1 wherein said insert body is solid.

4. Structure according to claim 1 wherein said beam is rectangular in cross section and has a relatively wide jointing notch in one side and a narrower jointing notch in another side at 90 degrees to said first-mentioned jointing notch and said insert body has first and second nesting notches corresponding to said respective jointing notches.

5. Structure according to claim 1 wherein said insert body defines at least one internal insert void.

6. Structure according to claim 5 wherein said insert body is substantially hollow with at least one internal reinforcing web.

7. Structure according to claim 6 wherein said insert body is a transverse section cut from a drawn body drawn with continuous longitudinal webs which comprise transverse webs in said transverse section.

8. Structure according to claim 7 wherein said drawn body is a pultruded composite.

9. Structure according to claim 8 wherein said pultruded composite includes a combination of unidirectional longitudinally extended fibers and multi-directional mat fibers.

10. Structure according to claim 9 wherein said insert body is composed of fibers and resin producing at least twice the resistance to shear forces as said beam.

11. A substantially hollow structural beam comprising an outer wall with a continuous internal structural void of substantially uniform cross section having a jointing notch therein to interlockingly engage other notched structural members defined into the side of the beam intermediate the ends of said beam for the purpose of interlocking with a crossmember, said jointing notch communicating with said void through said outer wall causing a discontinuity therein with an unsupported wall edge which defines said notch, and having a reinforcing insert body inserted therein, said insert body having a nesting notch configured to conform substantially to the contours of said jointing notch such that said notches together define a composite notch with a substantially continuous contour to reinforce said beam in the region around said jointing notch.

12. Structure according to claim 11 and including an epoxy bond at the interfaces between said insert body and said beam.

13. Structure according to claim 11 wherein said insert body is a transverse section of a longitudinally pultruded composite member having an internal reinforcing web structure.

14. Structure according to claim 11 wherein said beam has a hollow end extending just beyond an interlocking joint and said insert body is of length such that it defines a planar end substantially flush with and sealing said hollow end.

15. Structure according to claim 14 wherein said insert body is solid.

16. Structure according to claim 11 wherein said beam defines a longitudinal slit in one side thereof longitudinally spanning said jointing notch to permit longitudinal adjustment of said insert body within said beams to align said jointing and nesting notches.

17. Structure according to claim 16 wherein said slit is defined on the same side of said beam as said jointing notch.

18. Structure according to claim 17 wherein the interior contours of said hollow beam substantially corresponds with the external configuration of said insert body except that said beam is slightly resilient and pinched around said slit to frictionally grip said insert body when it is inserted therein.

19. A joint comprising a plurality of hollow interlocking structural beams at least some of which have jointing notches which interlock with one another to create a rigid joint, with said jointing notches each being reinforced by means of a reinforcing insert body inserted into the respective hollow structural beam, and each of said insert bodies having a nesting notch aligned with a respective jointing notch of the respective beam to create a multiple dimensional reinforced joint.

20. Structure according to claim 19 wherein said beams are all comprised of pultruded composites.

21. Structure according to claim 20 wherein said insert bodies are solid.

22. Structure according to claim 20 wherein said insert bodies are each a transverse section of a pultruded composite.

23. Structure according to claim 22 wherein said pultruded composite defines a plurality of longitudinally extending reinforcing webs.

24. A method of reinforcing a hollow structural beam having a jointing notch therein, comprising the following steps:
   a) selecting an insert body having an external transverse cross-sectional contour substantially identical to the internal contour of said hollow notched structural beam and having a nesting notch corresponding to said jointing notch;
   b) inserting said insert body into said hollow beam through one end of the beam; and,
   c) aligning said nesting notch with said jointing notch such that said insert body reinforces said beam at the region of said jointing notch.

25. A method according to claim 24 and including the further step of applying epoxy to said insert body at areas thereon where it will interface with the interior of said beam.

26. A method according to claim 25 wherein said beam is part of a multiple-beam interlocking joint and including the further step of applying epoxy to the entire joint.

27. A method according to claim 25 and including the preliminary steps of producing a composite pultrusion having a transverse cross-section identical to the longitudinal cross-section of said insert body and cutting a transverse section from said pultrusion of cut dimension to snugly fit within said hollow structural beam.

28. A method according to claim 27 and including the step of defining at least one longitudinal structural reinforcing web and said pultrusion.

29. A method according to claim 27 and including the further step of cutting an additional nesting notch in said insert body at 90 degrees to the first-mentioned nesting notch.

* * * * *